(12) United States Patent
Grasblum (10) Patent No.: US 9,729,088 B2
(45) Date of Patent: Aug. 8, 2017

(54) METHOD, COMPUTER PROGRAM PRODUCT AND CONTROLLER FOR STARTING-UP A SWITCHED RELUCTANCE MOTOR, AND ELECTRICAL APPARATUS IMPLEMENTING SAME

(71) Applicant: Pavel Grasblum, Frenstat Pod Radhostem (CZ)

(72) Inventor: Pavel Grasblum, Frenstat Pod Radhostem (CZ)

(73) Assignee: NXP USA, Inc., Austin, TX (US)

( * ) Notice: Subject to any disclaimer, the term of this patent is extended or adjusted under 35 U.S.C. 154(b) by 126 days.

(21) Appl. No.: 14/785,672

(22) PCT Filed: Apr. 22, 2013

(86) PCT No.: PCT/IB2013/053171
§ 371 (c)(1),
(2) Date: Oct. 20, 2015

(87) PCT Pub. No.: WO2014/174339
PCT Pub. Date: Oct. 30, 2014

(65) Prior Publication Data
US 2016/0072413 A1    Mar. 10, 2016

(51) Int. Cl.
*H02P 1/00* (2006.01)
*H02P 1/16* (2006.01)
(Continued)

(52) U.S. Cl.
CPC .............. *H02P 1/163* (2013.01); *H02P 25/08* (2013.01); *H02P 25/089* (2016.02)

(58) Field of Classification Search
CPC ......... H02P 1/163; H02P 25/08; H02P 25/089
(Continued)

(56) References Cited

U.S. PATENT DOCUMENTS 4,642,543 A    2/1987   MacMinn
4,933,620 A    6/1990   MacMinn et al.
(Continued)

FOREIGN PATENT DOCUMENTS

CN    1323096 A2    11/2001
CN    1734928 A     2/2006
(Continued)

OTHER PUBLICATIONS

International Search Report and Written Opinion correlating to PCT/IB2013/053171 issued on Jan. 27, 2014.
(Continued)

*Primary Examiner* — Bentsu Ro
*Assistant Examiner* — Gabriel Agared (57) ABSTRACT

A method of starting-up a switched reluctance, SR, motor is provided. The method comprises simultaneously energizing a plurality of phases at a first time point with respective phase voltages that are substantially the same, until the motor rotor is stabilized in alignment with either one of the plurality of phases; simultaneously de-energizing the plurality of phases at a second time point that follows the first time point; monitoring a decrease of respective phase currents in the plurality of phases from a third time point that follows the second time point by a first predetermined time interval; determining a phase of alignment of the rotor using evaluation of the decrease of the phase currents following simultaneous de-energizing of the plurality of phases; and, initiating rotation of the rotor from the determined phase of alignment of the rotor.

17 Claims, 5 Drawing Sheets

(51) Int. Cl.
*H02P 25/08* (2016.01)
*H02P 25/089* (2016.01)

(58) Field of Classification Search
USPC ........................................................ 318/139
See application file for complete search history.

(56) References Cited

U.S. PATENT DOCUMENTS

| | | | |
|---|---|---|---|
| 5,043,643 A * | 8/1991 | Hedlund | H02P 25/089 318/254.2 |
| 5,097,190 A | 3/1992 | Lyons et al. | |
| 5,107,195 A | 4/1992 | Lyons et al. | |
| 5,325,026 A | 6/1994 | Lyons et al. | |
| 5,420,492 A * | 5/1995 | Sood | H02P 6/08 318/400.41 |
| 5,793,179 A | 8/1998 | Watkins | |
| 5,955,861 A | 9/1999 | Jeong et al. | |
| 6,011,377 A * | 1/2000 | Heglund | H02P 9/40 318/254.2 |
| 6,411,060 B1 * | 6/2002 | Jung | H02P 6/16 318/400.13 |
| 6,448,736 B1 | 9/2002 | Lajsner et al. | |
| 2002/0089301 A1 | 7/2002 | Slater et al. | |
| 2003/0193309 A1 * | 10/2003 | Sozer | H02P 6/08 318/701 |
| 2006/0022623 A1 | 2/2006 | Inaba et al. | |
| 2006/0043915 A1 | 3/2006 | Kim | |
| 2010/0102768 A1 | 4/2010 | Leong et al. | |
| 2013/0082630 A1 | 4/2013 | Purfuerst et al. | |
| 2014/0117901 A1 * | 5/2014 | Gerdes | H02P 25/083 318/400.33 |

FOREIGN PATENT DOCUMENTS

| | | |
|---|---|---|
| CN | 101902189 A | 12/2010 |
| EP | 0856937 A2 | 8/1998 |
| EP | 2579448 A1 | 4/2012 |

OTHER PUBLICATIONS

Salmasi, F.R., "Virtual off-line auto calibrating position and current sensors for switched-reluctance-motor drive," IEE Proc.-Electr. Power Appl., vol. 153, No. 4, Jul. 2006, 8 pages.

* cited by examiner

METHOD, COMPUTER PROGRAM PRODUCT AND CONTROLLER FOR STARTING-UP A SWITCHED RELUCTANCE MOTOR, AND ELECTRICAL APPARATUS IMPLEMENTING SAME

FIELD OF THE INVENTION

This invention relates to a method of starting-up a switched reluctance motor, to a computer program product, to a controller, and to an electrical apparatus implementing same.

BACKGROUND OF THE INVENTION

Switched reluctance (SR) motors have gained popularity over the years due to their low-cost construction and high speed/torque performance.

The present disclosure relates to SR motors control devices and methods.

An SR motor is energized phase by phase in sequence, to generate reluctance torque and enable smooth motor rotation. The number of strokes (N) in an SR motor per one revolution of the rotor is dependent on the number of phases (M) of the stator and the number of rotor poles (P). It is given by the following relation:

$$N = M \times P \quad (1)$$

Therefore, the stroke angle (S) in mechanical degrees is defined as:

$$S = 360°/N \quad (2)$$

When the number of poles is very large and the stroke angle is very small, the SR motor is typically operated in open loop as a variable reluctance stepper motor and needs no knowledge of rotor position information during running condition. On the other hand, when the number of poles is small and the stroke angle is very large, the SR motor is generally operated in closed loop during running condition and hence, the knowledge of accurate rotor position information is very important to rotate the motor.

Accurate rotor position information may be obtained from a shaft position sensor. However, shaft position sensors are expensive and have reliability problems and hence, sensorless operation of SR motors has become a challenging alternative for designers.

There thus exist techniques for driving SR motors without a shaft position sensor. For instance, in a shaft position sensorless SR motor, a rotor angular position can be estimated according to various methods, which are typically based on the flux-linkage and the inductance characteristics of the motor with respect to the rotor position.

For instance, U.S. Pat. No. 6,448,736 discloses a method of controlling an SR motor comprising a step of aligning the motor, which is carried out once, followed by steps of energizing and de-energizing the stator phases and of monitoring the phase current in the stator phases of the SR motor, which are then continuously repeated. The step of aligning the motor comprises energizing one single phase of the motor. Because only one phase of SR motor is supplied during alignment, the rotor aligns under this phase. However, unwanted rotor oscillations during the alignment cause significant time for the rotor to settle. These oscillations stem, in particular, from the asymmetry of the rotor which provides that the motor always starts rotating in the right direction. In practise, the rotor stabilization may take up to a few seconds, for instance no less than 2 seconds.

SUMMARY OF THE INVENTION

The present invention provides a method of starting-up a switched reluctance motor, a computer program product, a controller, and an electrical apparatus implementing same, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

In what follows, there will be described embodiments of a method of and a device allowing faster start-up of e.g. a 2-phase Switched Reluctance (SR) motor with e.g. asymmetrical rotor using sensorless control technique, i.e., having no angular position sensor.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

SR motors are brushless electrical motors. While the stator has windings (or "coils") on each pole, the rotor does not have windings. Stator pole coils which are electrically connected in series (or in parallel) form a so-called phase winding (hereinafter "phase").

Figure 1A:
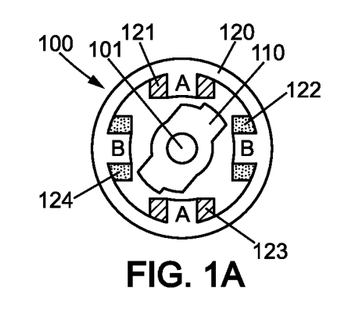
FIGS. 1A-1C illustrate a simplified diagram of a switched reluctance (SR) 2-phase motor with unaligned rotor, rotor aligned with a one phase and rotor aligned with the other phase, respectively, when a rotor alignment scheme according to the prior art is performed.

A simplified diagram of a 2-phase SR motor 100 is shown in FIG. 1A.

Motor 100 comprises a rotor 110 and a stator 120. Stator 120 has a plurality of coils 121, 122, 123, 124 located at stator poles. The diagram is a top view with rotational axis 101 perpendicular to the page. Having an asymmetric rotor (as illustrated) is convenient, but not essential.

Coils 121/123 and 122/124 are electrically coupled (serially or in parallel) to form a plurality of phases, with at least "first" phase A and "second" phase B, respectively. For simplicity, FIG. 1A illustrates motor 100 with only two phases. However, it will be appreciated that the proposed solution may be implemented for SR motors with more than two phases.

Figure 1B:
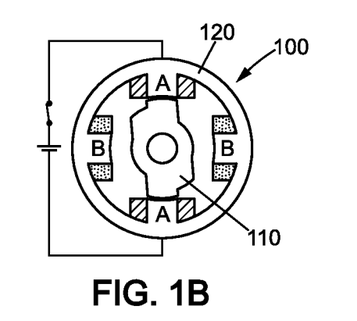
Figure 1C:
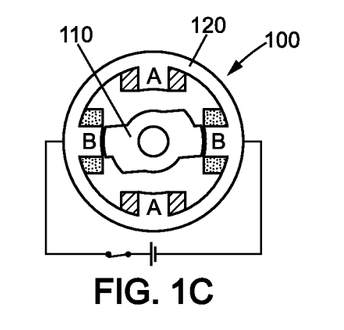

FIG. 1A conveniently illustrates non-alignment between rotor and phases, whereas FIG. 1B and FIG. 1C conveniently illustrate the alignment between rotor and phase A and the alignment between rotor and phase B, respectively. The rotor is in alignment with a phase (or "aligned" with a phase), when energizing the phase does not contribute to any torque, or rotation of the rotor (minimum reluctance position). Accordingly, when the rotor is not in alignment with the one phase (or "non-aligned"), energizing this phase moves the rotor in either direction to align with said phase.

In running operation of motor 100, i.e. after rotation of the rotor 110 has been initiated, a controller switches the phases of stator 120 in a predetermined sequence that is synchronized with the angular position of the rotor relative to the stator (hereinafter the rotor position). At each stroke, a single phase is energized, and the rotor 110 moves by a position angle of about 90 degrees so that the rotor aligns with phase A if it was aligned with phase B, or vice versa. Moving rotor 110 counterclockwise from a rotor position corresponding to a reference phase defining (by convention) an angle of 0 degree, would increase the angle to 90, 180 and 270 degrees before completing a 360-degree turn. For motors with more phases, rotor 110 aligns with the adjacent phase, when energized, by a smaller angle as defined by above relation (2).

Knowledge of the rotor position relative to the stator ("shaft angle") is desired at any time of operation, and especially desired when the controller initiates the rotation of the rotor during the so-called "start-up" of the SR motor.

Various methods are known in the art that address the start-up scenario. Often, the rotor position is measured and position information is fed into the controller. Rotor position measurement is performed with specially dedicated position sensors or without them (so-called "sensorless" schemes). Measurement can comprise the estimation of magnetic flux, phase inductance, phase current in an energized phase or in a de-energized phase, or the measurement of other physical quantities.

However, digital sensorless control techniques are required nowadays to drive 2-phase SR motors as shown in FIG. 1A, in order to reduce price and increase reliability of the solution.

In the same time, the SR motor requires start-up alignment in order to start the motor with full torque.

Since there is no position sensor, the initial rotor position has to be known for proper start-up of the SR motor. This issue is usually solved by rotor alignment. A single one of the phases is energized and the rotor is aligned with the stator pole of the energized phase.

As shown in FIG. 1B, rotor 110 may be aligned with phase A. Rotor 110 is not aligned with phase B. This is achieved, according to known techniques, by energizing phase A and not energizing phase B of the stator.

In a variant, rotor 110 may be aligned with phase B as shown in FIG. 1C. Rotor 110 is not aligned with phase A. This is achieved by energizing phase B and not energizing phase A of the stator.

In case of 2-phase SR motor with asymmetric rotor, however, the alignment according to the above "1-phase" scheme takes up to few seconds. Such alignment time is not acceptable in many applications like vacuum cleaners, where the motor start-up is required within, for instance, 500 ms.

Figure 2A:
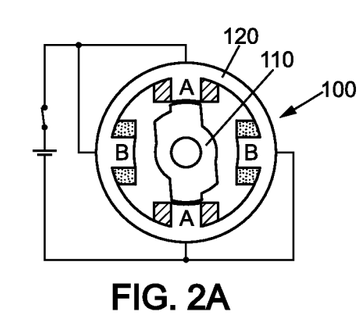
FIG. 2A and FIG. 2B illustrate the SR motor of FIG. 1A stabilized in the one rotor position and the other rotor position, respectively, when the rotor alignment scheme according to proposed embodiments is performed.
Figure 2B:
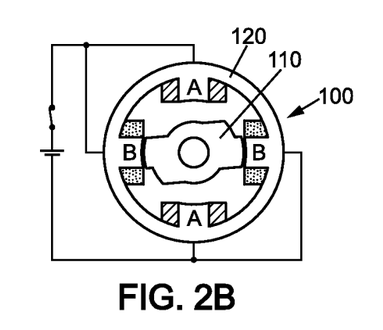

The proposed method uses 2-phase alignment, meaning that both phases are energized at the same time, as illustrated in FIGS. 2A-2B. Thus, the rotor stabilizes with the nearest stator pole.

In this case, the rotor is stabilized approximately from 5 to 10 times faster than with usual 1-phase alignment methods. Indeed, it could be observed a reduction in the alignment time from approximately 2 s to approximately 200 ms when using a 2-phase alignment. However at the end of alignment, the rotor is aligned under still unknown stator pole, namely the rotor position as shown in FIG. 2A or the rotor position as shown in FIG. 2B. The presented embodiments also allow determining the exact position, i.e., phase of alignment of the rotor by detecting the stator pole where the rotor is aligned.

Overall, the proposed embodiments enable to align the rotor and recognize the initial position for motor start-up in shortest time possible. Other methods mentioned in prior art need longer time to settle the rotor in the known position reliably.

Figure 3A:
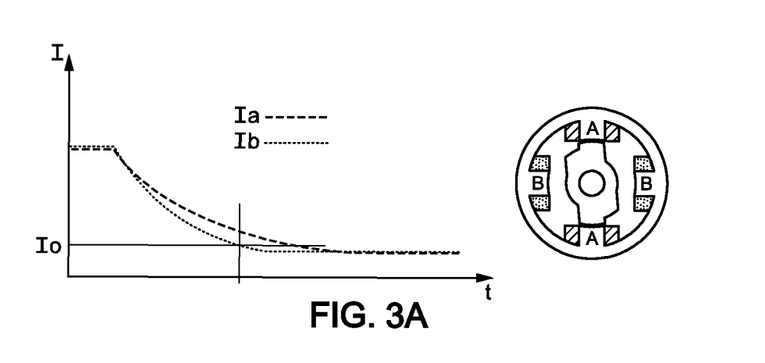
FIGS. 3A and FIG. 3B illustrate simplified time diagrams of the decrease in the phase currents of the motor of when the phases are de-energized after stabilization of the rotor in the position as shown in FIG. 2A and FIG. 2B, respectively.
Figure 3B:
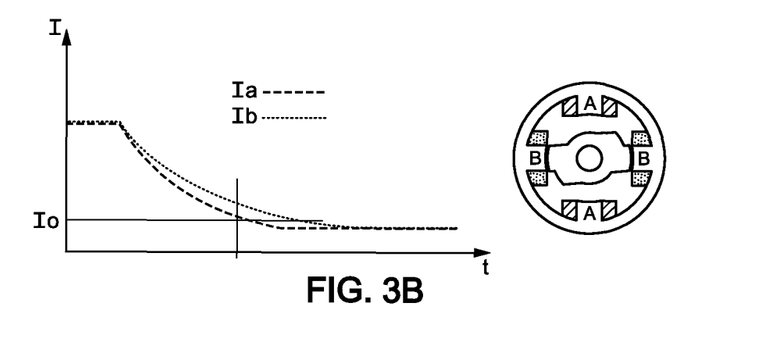

FIGS. 3A and FIG. 3B illustrate simplified time diagrams of the decrease in the phase currents of the motor when the phases are de-energized after the rotor has stabilized in either rotor position as a result of simultaneously energizing the two phases, as shown in FIG. 2A and FIG. 2B, respectively.

At the end of the 2-phase alignment, the same currents flow through both coils. When the power source is switched off (for both phases), the currents start to fall down. As can be observed in FIGS. 3A and FIG. 3B, however, the slope of currents falling is different and depends on rotor position.

It is well known in the art, indeed, that the inductance L of each phase depends on the rotor-to-stator position. Therefore, phases A and B exhibit variable inductances. For example, inductance of phase B is high at 0 degree (as in FIG. 1C), low at 90 degree (as in FIG. 1B), high at 180 degree, and low at 270 degree.

In the example as shown in FIG. 3A, the current in phase B reaches zero before the current in phase A, meaning that the rotor is aligned with stator pole of phase A. In the example as shown in FIG. 3B, conversely, the current in phase A reaches zero before the current in phase B, and thus the rotor is determined to be aligned with stator pole of phase B.

The proposed embodiments take advantage of this inductance-to-position dependency by keeping the phase voltage constant during simultaneous de-energizing of both phases, and monitoring the discharge currents in phases A and B. Stated otherwise, embodiments rely on the use of discharge current monitoring for the detection of rotor alignment. For instance, immediately or shortly after the power source is switched off, both currents are continuously measured to detect the exact rotor position. In short, the phase where the current achieves zero value last, is the aligned phase.

Figure 4:
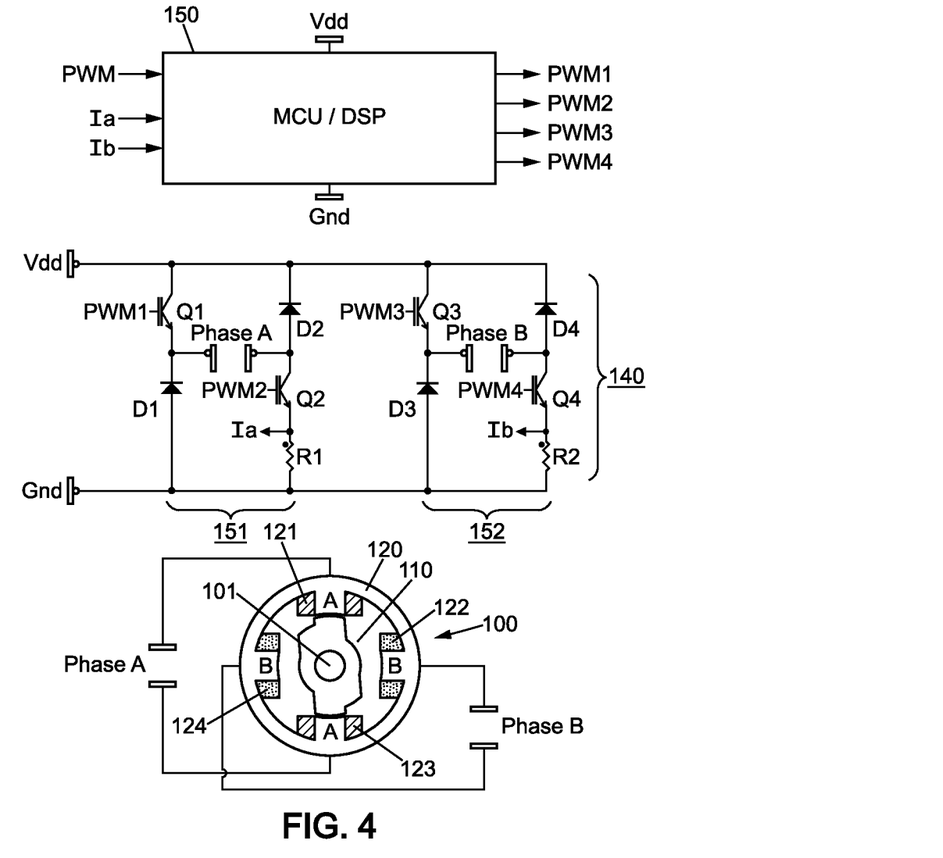
FIG. 4 schematically shows an example of an embodiment of a SR motor controller that is coupled to the SR motor of FIG. 1A.

FIG. 4 illustrates a simplified diagram of motor controller 150 according to embodiments of the present invention, that which coupled to the SR motor 100 as shown in FIG. 1A through a power stage 140.

Controller 100 is capable to energize phases A and B via separate power supply paths 151 and 152, respectively. In the shown example, supply paths 151 and 152 both have a H-bridge structure. For instance, supply path 151 comprises a first branch having a high-side switch Q1 in series with a low side free-wheeling diode D1, and a second branch having a low-side switch Q2 in series with a high side free-wheeling diode D2. In the same manner, supply path 152 comprises a first branch having a high-side switch Q3 in series with a low-side free-wheeling diode D3, and a second branch having a low-side switch Q4 in series with a high side free-wheeling diode D4.

As in the shown example, switches Q1, Q2, Q3 and Q4 may comprise a N-type bipolar transistor, such as a N-type bipolar or Field Effect Transistor, FET. This is only an example, though. For instance, high-side switches Q1 and Q3 may also be implemented using a P-type bipolar transistor. In other embodiments, switches Q1, Q2, Q3 and Q4 may each comprise a Metal Oxyde Semiconductor (MOS) transistor, e.g. high-side switches Q1 and Q3 may be implemented as P-type MOS (PMOS) transistors and low-side switches Q2 and Q4 may be implemented as N-type MOS (NMOS) transistors. Also, any additional switching component and/or any alternative switching arrangement may be provided for the implementation of switches Q1, Q2, Q3 and Q4, for instance being adapted to speed-up switching, reduce switching losses, avoid current leakage in static mode, etc.

Diodes D1, D2, D3 and D4 may comprise a bipolar transistor or a MOS transistor connected to operate as a diode Switches Q1, Q2, Q3 and Q4 are controlled by control signals PWM1, PWM2, PWM3 and PWM4, respectively, which are generated by controller 150. In one example, these signals may be Pulse Width Modulated (PWM) signals, having a cyclic ratio adapted to control the power transferred to the motor, and thus the torque of the motor.

Each of the supply paths 151 and 152 can be energized separately by the controlling signals PWM1/PWM2 or PWM3/PWM4, respectively. After the rotation of the motor has been initiated, either phase A or phase A is energized at one time.

As it can be seen in FIG. 4, the present invention does not require a mechanical position sensor. The rotor position is obtained by monitoring the current. More precisely, current sensors (CS) may be used to sense the current flowing in each of the phase windings A and B of the SR motor 100.

To this end, current sensors R1 and R2 may be arranged in supply paths 151 of phase A and in supply path 152 of phase B, respectively. These current sensors are adapted to feed representations of phase current Ia in phase A, and of phase current Ib in phase B, respectively, back to controller 150. In one example, such representation is numerical. Sensors R1 and R2 are conveniently implemented by series resistors so that numerical representation of current Ia and Ib is obtained via a voltage measurement and analog-to-digital (ND) conversion, well known in the art. The resistors R1 and R2 have a resistance value chosen to adjust whole phase current operating range into level suitable for current sense inputs Ia, Ib of controller 150. For instance, the resistance value of the series resistors R1 and R2 may be comprised between 1 mΩ and 100 mΩ (where "mΩ" stands for milli-ohms). The maximum value of resistors R1 and R2 is limited by the power which can be dissipated in the resistor. The minimal value is tied to the necessity to get reliable signal (possibly after amplification), which can be processed by the controller 150, e.g. by an internal Analog-to-Digital Converter (ADC) of the controller Having current sensors R1 and R2 implemented at the bottom of the supply paths of phases A and B, respectively, is convenient because these resistors are thus grounded, i.e., not floating, and measurement by the controller 150 is easier. But other implementations may be considered, wherein, for instance, the current sensing resistors can be arranged as floating resistors. In other embodiments, current sensors R1 and R2 may optionally be part of the controller 150. Finally, in order to raise accuracy, persons of skill in the art can use further sensors, without departing from the present invention and without the need of further explanation herein.

Controller 150 may conveniently be implemented by a micro-controller unit (MCU) or a digital signal processor (DSP). The microcontroller may thus be a conventional programmable Integrated Circuit (IC). When controller 150 and motor 100 are used, for example, in industrial machines, in household appliances (e.g., vacuum cleaner, food processor, air conditioner, washing machine, dish washer), vehicles (e.g., starter/generator, window lifter, pumps) or in many other applications, the microcontroller can be used for other purposes within the application.

The entire start-up scheme with the rotor 2-phase alignment and the current discharge based angular position determination, may be implemented with the help of a software (SW) running on the controller 150.

Figure 5:
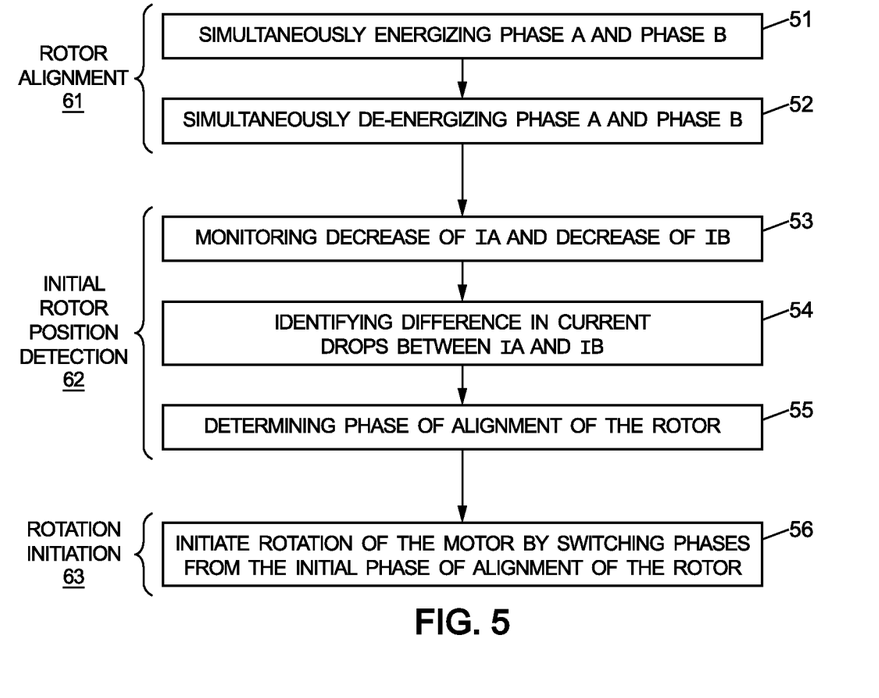
FIG. 5 illustrates a method flow chart diagram of a method of starting-up a SR motor according to embodiments of the present invention.

The operating of the device as shown in FIG. 4 according to the proposed method of starting-up a SR motor will now be described with reference to the flow chart diagram of FIG. 5 and further to the time diagram of FIG. 6 which gives the current in the phases of the motor of FIG. 1A during the whole start-up sequence.

In 51, the M phases (with M=2 in the shown examples) are simultaneously energized at a first time point t1 with respective phase voltages that are substantially the same, until the rotor is stabilized in alignment with either one of the phases (A or B, in the shown examples), as previously described with reference to FIG. 2A and FIG. 2B. The phase voltage of phase A is determined by signals PWM1 and PWM2, and the phase voltage of phase B is determined by signals PWM3 and PWM4.

In 52, the M phases are simultaneously de-energized, at a second time point t2 that follows the first time point t1. It will be appreciated that e-energizing only one phase (or only some of the phases when M>2) may cause the rotor to move in order to align with the other phase (respectively one of the other phases) and thus change position of alignment. This is avoided by de-energizing all stator phases simultaneously.

Each phase may be de-energized by either one of at least the two following two control schemes.

According to a first control scheme, both transistors Q1 and Q2 are switched off at the same time. In this case, due to inductive load the current continues to flow through diodes D1 and D2 back to the power supply. The phase current does not flow through the resistor R1 as shown in FIG. 4. Thus, if this scheme is to be implemented, resistor R1 should better be inserted in the other branch of the bridge, e.g., in series with diode D1.

According to another control scheme, however only the high-side transistor Q1 is switched off and the phase current continues to flow through bottom transistor Q2, resistor R1 and diode D1.

Both schemes can be used for position detection. However there is difference in how fast the phase current drops down. In the first case the current drops down very fast because during freewheeling, the phase is subject to a voltage equal to −Vdd. In the second case the current drop is slower because the phase sees zero voltage. Thus, there is more time available for current detection by controller 150.

Whatever the control scheme used for de-energizing the phases, the simultaneous energizing 51 followed by the simultaneous de-energizing 52 form a rotor alignment phase of operation 61, at the end of which the rotor is aligned with one of the stator phases.

Figure 6:
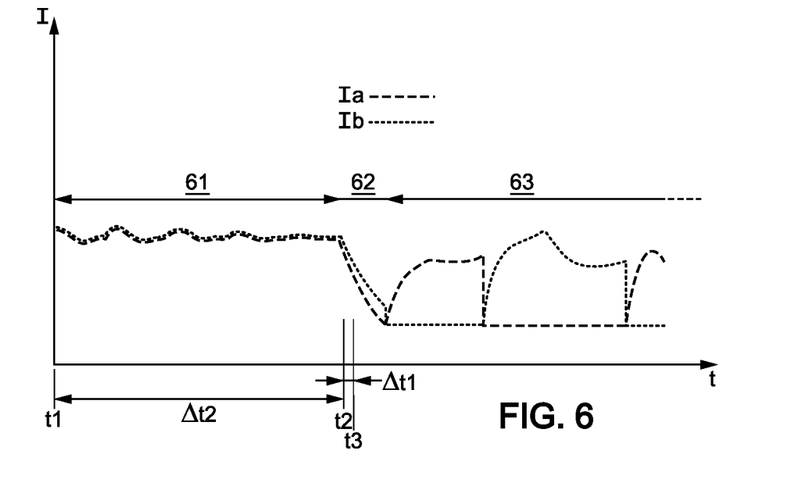
FIG. 6 illustrates a simplified time diagram of the current in the phases of the motor of FIG. 1A during the start-up sequence according to embodiments of the present invention.

The simultaneous supply of both phases during the energizing 51 enables fast rotor set-up with only small oscillations, as can be observed on curves depicted in FIG. 6 in the left hand portion corresponding to the rotor alignment phase of operation 61.

However, it remains to be determined the rotor position after alignment. This is achieved by the second phase of operation 62, in which the rotor position is detected after alignment by using detection of discharge phase current in the phases.

More precisely, at 53 the decrease of the phase currents in the phases is monitored from a third time point t3 that follows the second time point t2 by a first predetermined time interval Δt1.

In one embodiment, the first predetermined time interval Δt1 is zero. Thus, t3 coincides with t2. This enables to detect the aligned rotor position without any time delay.

In 55, the phase of alignment of the rotor is determined using evaluation of the decrease of the phase currents following, i.e., caused by or resulting from the simultaneous de-energizing of the M phases.

In some embodiments, determining the phase of alignment of the rotor may comprise, i.e. be based on identifying a difference between current drops in the plurality of phases following the simultaneous de-energizing of said phases. Indeed, the slope of the decrease of the phase currents after the energizing of the phases has been switched off is dependent on the rotor position, as was previously explicated with reference to FIG. 3A and FIG. 3B.

More precisely, the phase of alignment of the rotor may be determined to be the phase in which the current, as a result the simultaneous de-energizing of the plurality of phases at 52, falls below a predetermined current threshold last.

Indeed, when the power source is switched off (for both phases), the currents start to fall down. The respective drops of the currents differ to each other based on the actual position of the rotor. This phenomenon is used to detect exact rotor position. The phase, where the current achieves zero value later, is the aligned phase.

The invention thus enables to detect the aligned rotor position without any complex software or hardware means.

As the measurement of any exact zero quantity is difficult due to noise in the system, the above mentioned predetermined current threshold may be selected as the lowest possible threshold which allows eliminating noise in the system and reliably detecting almost zero current condition. The current threshold may correspond to a few percentage of the peak current in the phases, for instance less than 5%, e.g. 2%. In some embodiments, the current threshold may be set so as to define an almost zero current condition, that is to say a zero current condition being detectable by the controller 150, with respect to the resistor value of current sources R1 and R2 and an input measurement range of controller 150 of, for instance a few hundreds millivolts, e.g. 200 mV.

In 56, rotation of the rotor may be initiated from, i.e., based on knowledge of the phase of alignment of the rotor which has been determined as explained above. With reference to the time diagram of FIG. 6, this corresponds to a phase 63 of actual starting-up of the motor from an aligned, known initial rotor position. This starting-up may comprise any convenient sequence for switching the phases of the stator.

A traditional lock and forced drive method with open loop operation can be applied for starting the motor. The phases may then be switched on and off according to a closed-loop controlling. To this end, the phase currents Ia and Ib may also be monitored by controller 150 using the same means as described above.

It will be observed, however, that the start-up sequence and the switching of phases in the established mode of operation of the motor are not part of the innovation (which lies in the rotor alignment scheme), and can be achieved in any suitable manner as known in the art. Therefore their detail description would go beyond the scope of the present description, and will not be provided here.

In some embodiments, the phase 61 of rotor alignment may further comprise monitoring oscillations of the current in at least one of plurality of phases during the simultaneous energizing 51 of all phases. The phases may thus be simultaneously de-energized (at second time point t2) after oscillations of said current have decreased below a predetermined threshold.

For instance, the second time point t2 follows the first time point t1 by a second predetermined time interval Δt2. This time interval may have a fixed value or may correspond to a given number of, e.g. a few time periods of the control signals PWM1, PWM2, PWM3 and PWM4, for instance. It may thus be defined so as to be long enough for allowing convenient stabilization of the rotor in the particular application.

Overall, the proposed solution improves the motor start-up time, to an extent that is convenient for a majority of motor control drive applications. The invention thus helps to design the sensorless SR drives and elimination of expensive position sensor. From this perspective the invention brings benefit of cost reduction of the drive. This idea may be used in software solution for sensorless control of SR motors, like in vacuum cleaners, food processors and other similar applications.

The invention thus further proposes an electrical apparatus as illustrated in FIG. 4. The apparatus comprises a switched reluctance, SR, motor 100, having a rotor 110 and a stator 120, wherein the stator has a plurality of coils 121, 122, 123, and 124, wherein electrically coupled coils form a plurality of phases with at least a first phase A and a second phase B.

The apparatus further comprises a power stage 140 as previously described with reference to FIG. 4, adapted to drive the phases of the motor.

Finally, the apparatus comprises a controller 150, the operation of which has been described in the foregoing.

For a SR motor 100 with M phases, the power stage 140 may comprise a number M of H-bridge arrangements of power switches, each power switch being controlled by a control signal like PWM1, PWM2, etc., output by the controller 150 as illustrated by FIG. 4 which has been explicated above.

In embodiments as illustrated and described above in an example where M=2, the electrical apparatus may further comprises a number M of current sensors like resistors R1 and R2, each being arranged in a respective one of the H-bridge arrangements 151 and 152, respectively, and being adapted to provide a current sensing signal Ia and Ib, respectively, to the controller.

The above description of proposed embodiments is primarily focused on start-up of 2-phase SR motors. It will be appreciated, however, that the same technique can be used for SR motor with multiple phases as well; namely with a number M of poles greater than two. In this case the power is supplied to all phases during the step of energizing 51, thus forcing the motor to turn into a position of alignment with the nearest phase. Then by monitoring the discharge current of all M phases the aligned one can be identified. More precisely, the rotor is determined to be aligned with that phase of which the phase current decreases below the threshold last.

Examples of SR motors commonly used in industrial applications are motors with a number M of phases and a number P of rotor poles wherein, for instance, M=3 and P=2 or P=4, or M=4 and P=6, or M=5 and P=8, etc.

Embodiments of the proposed solution may find applications for instance, in industrial machines, in household appliances (e.g., vacuum cleaner, food processor, air conditioner, washing machine, dish washer), in vehicles (e.g., starter/generator, window lifter, pumps) or in many other applications which require fast motor start-up. It will be appreciated that the controller can be used for other purposes within the application.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, at least part of the power stage, e.g. the current sensors, may be part of the illustrated controller.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the controller 150 and the power stage 140 may be embedded within the same semiconductor product or on the same printed circuit board, or arranged within the same casing, e.g. at the back of the SR motor 100. Alternatively, the examples may be implemented as any number of separate integrated circuits or separate devices interconnected with each other in any suitable manner. For example, at least part of the power stage, e.g. the current sensors, may be embedded in the same IC chip as the controller. Also, at least the controller 150 may be part of a more general purpose control unit, i.e. adapted to achieve more functionalities in the application, and thus be distant from the SR motor 100, for example at some distance within the engine compartment of an automobile vehicle.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

Other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method of starting-up a switched reluctance, SR, motor having a rotor and a stator, wherein the stator has a plurality of coils, wherein electrically coupled coils form a plurality of phases with at least a first phase and a second phase, the method comprising:
    simultaneously energizing the plurality of phases at a first time point with respective phase voltages that are substantially the same, until the rotor is stabilized in alignment with either one of the plurality of phases;
    simultaneously de-energizing the plurality of phases at a second time point that follows the first time point;
    monitoring a decrease of respective phase currents in the plurality of phases from a third time point that follows the second time point by a first predetermined time interval;
    determining a phase of alignment of the rotor using evaluation of the decrease of the phase currents following simultaneous de-energizing of the plurality of phases; and,
    initiating rotation of the rotor from the determined phase of alignment of the rotor.

2. The method of claim 1, wherein the evaluation of the decrease of the phase currents following simultaneous de-energizing of the plurality of phases comprises identifying a difference between current drops in the plurality of phases.

3. The method of claim 2, wherein the phase of alignment of the rotor is the phase in which the current, following the simultaneous de-energizing of the plurality of phases, falls below a first predetermined current threshold last.

4. The method of claim 1, wherein the first predetermined time interval is zero.

5. The method of claim 1, further comprising monitoring oscillations of the current in at least one of the plurality of phases during the simultaneous energizing of said plurality of phases, and wherein the plurality of phases are simultaneously de-energized at the second time point after oscillations of said current have decreased below a second predetermined threshold.

6. The method of claim 1, wherein the first predetermined current threshold is adapted to define an almost zero current condition.

7. The method of claim 1, wherein the second time point follows the first time point by a second predetermined time interval.

8. A controller for starting-up a switched reluctance, SR, motor having a rotor and a stator, wherein the stator has a plurality of coils, wherein electrically coupled coils form a plurality of phases with at least a first phase and a second phase, the controller being adapted to:
    simultaneously energize the plurality of phases at a first time point with respective phase voltages that are substantially the same, until the rotor is stabilized in alignment with either one of the plurality of phases;
    simultaneously de-energize the plurality of phases at a second time point that follows the first time point;
    monitor a decrease of respective phase currents in the plurality of phases from a third time point that follows the second time point by a first predetermined time interval;
    determine a phase of alignment of the rotor using evaluation of the decrease of the phase currents following the simultaneous de-energizing of the plurality of phases; and,
    initiate (56) rotation of the rotor from the determined phase of alignment of the rotor.

9. The controller of claim 8, being further adapted to determine the phase of alignment of the rotor by identifying a difference between current drops in the plurality of phases following the simultaneous de-energizing of said plurality of phases.

10. The controller of claim 9, being further adapted to determined the phase of alignment of the rotor to be the phase in which the current following the simultaneous de-energizing of the plurality of phases falls below a first predetermined current threshold last.

11. The controller of claim 8, wherein the first predetermined time interval is zero.

12. The controller of claim 8, being further adapted to monitor oscillations of the current in at least one of the plurality of phases during the simultaneous energizing of said plurality of phases, and to de-energize the plurality of phases simultaneously at the second time point after oscillations of said current have decreased below a second predetermined threshold.

13. The controller of claim 8, wherein the first predetermined current threshold is adapted to define an almost zero current condition.

14. The controller of claim 8, wherein the second time point follows the first time point by a second predetermined time interval.

15. An electrical apparatus comprising:
a switched reluctance, SR, motor having a rotor and a stator, wherein the stator has a plurality of coils, wherein electrically coupled coils form a plurality of phases with at least a first phase and a second phase;
a power stage adapted to drive the phases of the motor; and,
a controller as defined in claim 8.

16. The electrical apparatus of claim 15, wherein the SR motor comprises a number M of phases, and the power stage comprises an equal number M of H-bridge arrangements of power switches, each power switch being controlled by a control signal output by the controller.

17. The electrical apparatus of claim 16, further comprising a number M of current sensors each being arranged in a respective one of the H-bridge arrangements, and being adapted to provide a current sensing signal to the controller.

* * * * *